(12) United States Patent
Hacker et al.

(10) Patent No.: US 9,421,655 B2
(45) Date of Patent: Aug. 23, 2016

(54) PLATE ASSEMBLY

(71) Applicant: GM GLOBAL TECHNOLOGY OPERATIONS LLC, Detroit, MI (US)

(72) Inventors: Bryan F. Hacker, Williamston, MI (US); Matthew D. Kaake, Burton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 150 days.

(21) Appl. No.: 14/264,116

(22) Filed: Apr. 29, 2014

(65) Prior Publication Data

US 2015/0306718 A1 Oct. 29, 2015

(51) Int. Cl.
*B23Q 3/10* (2006.01)
*B23P 19/04* (2006.01)

(52) U.S. Cl.
CPC ............... *B23Q 3/103* (2013.01); *B23P 19/042* (2013.01)

(58) Field of Classification Search
CPC ............................... B23P 19/042; B23Q 3/103
USPC ............ 269/289 R–289 MR; 60/796; 73/37.5
See application file for complete search history.

(56) References Cited

U.S. PATENT DOCUMENTS

| | | | | |
|---|---|---|---|---|
| 2,176,089 A * | 10/1939 | Malone | ..................... | B23Q 3/08 269/287 |
| 3,877,485 A * | 4/1975 | Wojcikowski | ......... | B21D 55/00 137/829 |
| 4,280,054 A * | 7/1981 | Guarino | ................ | H01L 21/681 250/440.11 |
| 4,887,341 A * | 12/1989 | Sakimori | .............. | B23P 19/006 29/430 |
| 6,264,186 B1 * | 7/2001 | Hill | ......................... | B23Q 1/032 269/289 R |
| 6,644,637 B1 * | 11/2003 | Shen | ....................... | B25B 5/061 269/152 |
| 6,993,821 B2 * | 2/2006 | Ahti | ....................... | B23Q 3/103 269/297 |
| 7,922,159 B2 * | 4/2011 | Troxler | .................. | B23Q 3/103 269/155 |
| 8,967,603 B2 * | 3/2015 | Innocente | .............. | B23Q 3/154 269/289 R |

FOREIGN PATENT DOCUMENTS

| | | |
|---|---|---|
| CN | 101108461 A | 1/2008 |
| EP | 1402985 A2 | 3/2004 |
| FR | 2977515 A1 | 1/2013 |

* cited by examiner

*Primary Examiner* — Joseph J Hail
*Assistant Examiner* — Henry Hong
(74) *Attorney, Agent, or Firm* — Quinn Law Group, PLLC

(57) ABSTRACT

A plate assembly can support a cylinder head and includes a frame. The frame includes a frame body and a supporting wall extending from the frame body. The frame body defines an inner frame surface. The inner frame surface and the supporting wall jointly define a frame cavity. The plate assembly also includes an insert configured to support the cylinder head. The insert is sized to be received in the frame cavity and includes an insert body. The insert body defines a top insert surface, a bottom insert surface opposite to the top insert surface, and a lateral insert surface interconnecting the top and bottom insert surfaces. The supporting wall supports the insert such that the inner frame surface surrounds the lateral insert surface and the supporting wall contacts the insert bottom surface when the insert is disposed in the frame cavity.

19 Claims, 2 Drawing Sheets

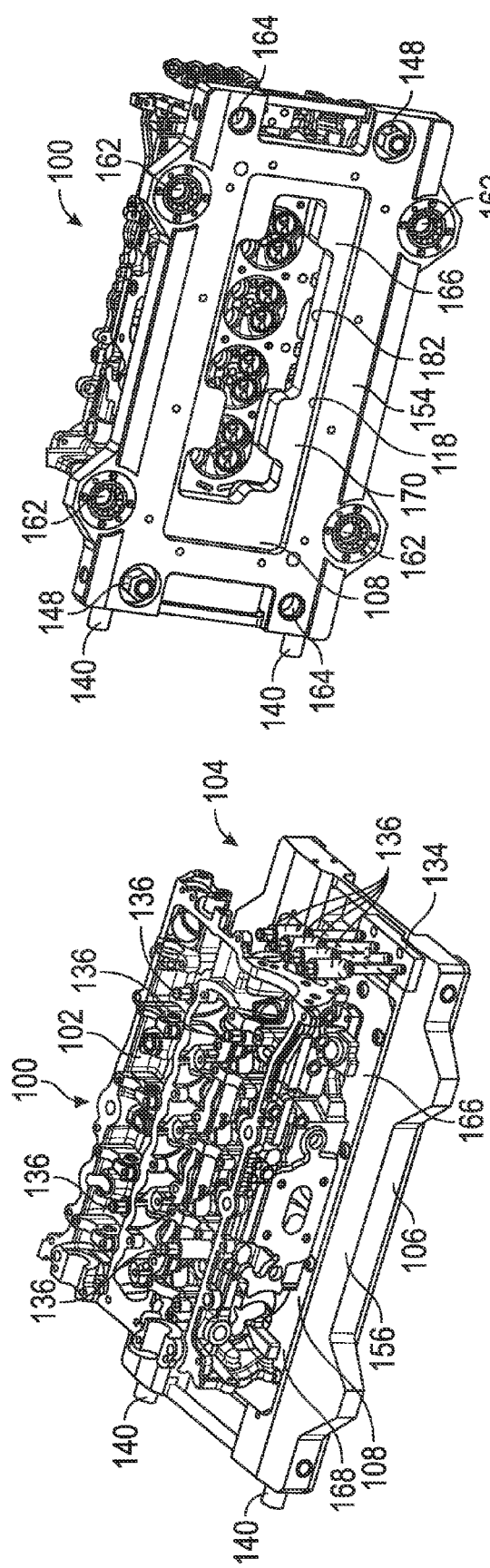
FIG. 1
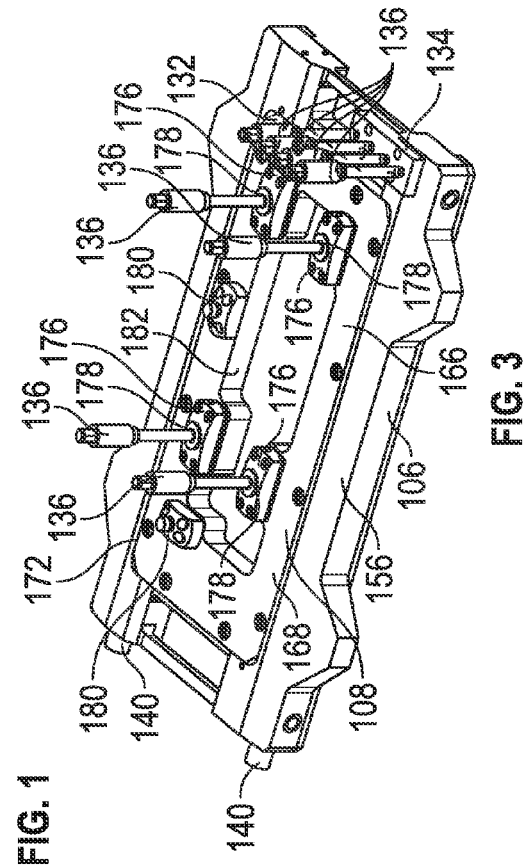
FIG. 2
FIG. 3

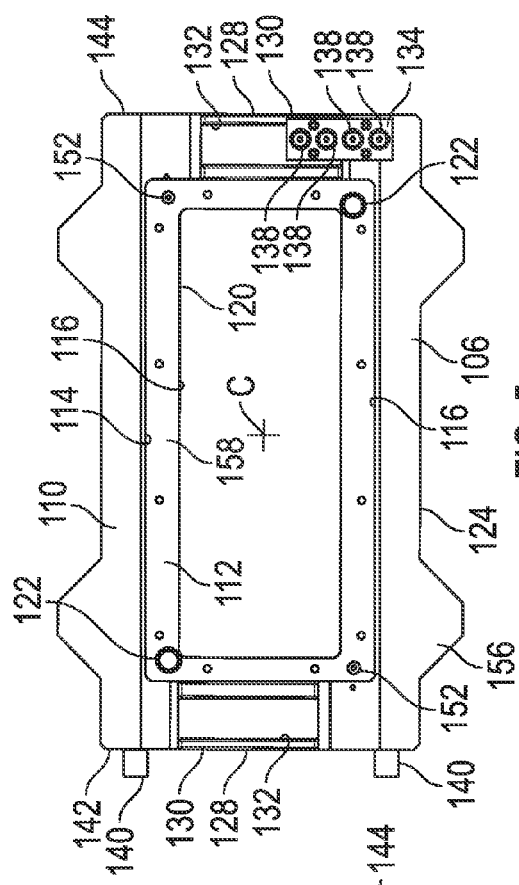
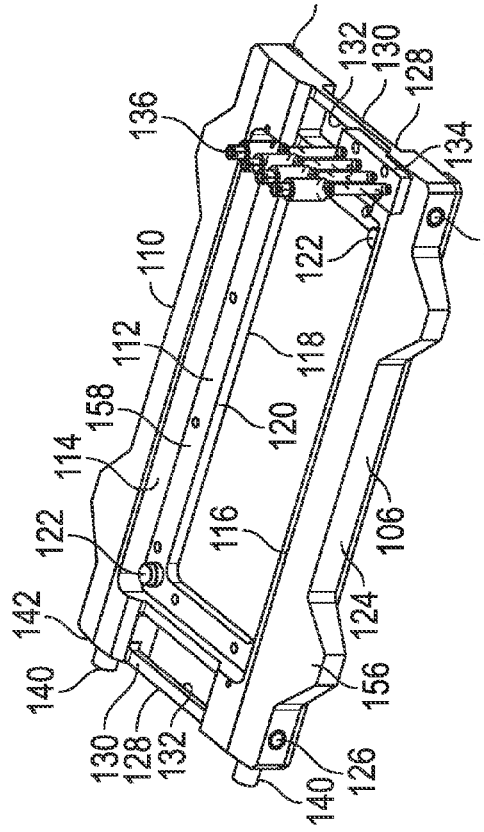
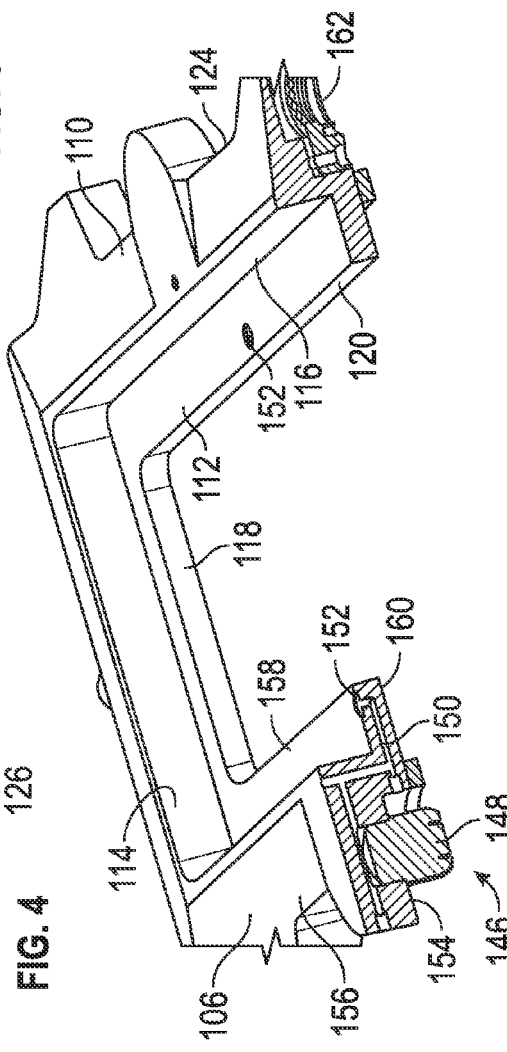
FIG. 5
FIG. 4
FIG. 6

PLATE ASSEMBLY

TECHNICAL FIELD

The present disclosure relates to a plate assembly configured to support a cylinder head.

BACKGROUND

During a manufacturing process of an internal combustion engine, a cylinder head must be assembled. To do so, the cylinder head must be supported while robotic arms (or other instruments) work on that cylinder head. Once assembled, the cylinder head can be coupled to the engine block.

SUMMARY

Plate assemblies are used to support a cylinder head while work is performed on the cylinder head. However, the shape of the cylinder head may change through the years and the current plate assemblies used to support the cylinder heads may need to be replaced in order to accommodate the particular shape of the new cylinder heads. It is therefore useful to have a plate assembly that has a universal frame that can be used with any cylinder head and an insert specifically made for directly supporting a particular cylinder head. The frame can hold the insert, and only the insert has to be replaced if the shape of the cylinder head changes. Accordingly, manufacturing costs can be minimized because the frame does not have to be replaced if the cylinder head changes. In one embodiment, the plate assembly includes a frame. The frame includes a frame body and a supporting wall extending from the frame body. The frame body defines an inner frame surface. The inner frame surface and the supporting wall jointly define a frame cavity. The plate assembly also includes an insert configured to support the cylinder head. The insert is sized to be received in the frame cavity and includes an insert body. The insert body defines a top insert surface, a bottom insert surface opposite to the top insert surface, and a lateral insert surface interconnecting the top and bottom insert surfaces. The supporting wall supports the insert such that the inner frame surface surrounds the lateral insert surface and the supporting wall contacts the insert bottom surface when the insert is disposed in the frame cavity. The present disclosure also relates to a manufacturing arrangement including a cylinder head and the plate assembly described above. As discussed above, the plate assembly supports the cylinder head.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic, front perspective view of a manufacturing arrangement including a cylinder head and a plate assembly supporting the cylinder head;

FIG. 2 is a schematic, bottom perspective view of the manufacturing arrangement shown in FIG. 1;

FIG. 3 is a schematic, perspective view of the plate assembly shown in FIG. 1 and a plurality of studs coupled to the plate assembly, wherein the plate assembly includes a frame and an insert disposed in the frame;

FIG. 4 is a schematic, perspective view of the frame shown in FIG. 3;

FIG. 5 is a schematic, top view of the frame shown in FIG. 3; and

FIG. 6 is a schematic, cross-sectional, perspective view of the frame shown in FIG. 3.

DETAILED DESCRIPTION

Referring now to the drawings, wherein the like numerals indicate corresponding parts throughout the several views, FIGS. 1-3 schematically illustrate a manufacturing arrangement 100 including a cylinder head 102 and a plate assembly 104 configured to support the cylinder head 102. The manufacturing arrangement 100 can be used to assemble an internal combustion engine. Specifically, the plate assembly 104 supports the cylinder head 102 while work is performed on that cylinder head 102. For example, robotic arms may perform work on the cylinder head 102 while the plate assembly 104 holds the cylinder head 102. The plate assembly 104 is therefore made of one or more materials that are sufficiently strong to support the weight of the cylinder head 102. However, the configuration of the cylinder head 102 may change through the years as cylinder head designs change and the current plate assemblies used to support the cylinder heads 102 may need to be replaced in order to accommodate the particular configuration of the new cylinder heads 102. It is therefore useful to have a plate assembly 104 that has a universal frame 106 that can be used with any cylinder head 102 and an insert 108 specifically made for a particular cylinder head 102. The frame 106 can hold the insert 108, and only the insert 108 has to be replaced if the configuration of the cylinder head 102 changes. Accordingly, manufacturing costs can be minimized because the frame 106 does not have to be replaced if the cylinder head 102 changes.

The frame 106 can directly support the insert 108, and the insert 108 directly supports the cylinder head 102. However, the frame 106 and insert 108 together support the cylinder head 102. Therefore, the frame 106 and insert 108 are wholly or partly made of a material sufficiently strong to support the weight of the cylinder head 102. As non-limiting examples, the frame 106 and insert 108 may be wholly or partly made of a metal, such as steel. Regardless of the specific material employed, the insert 108 is removably coupled to the frame 106.

With reference to FIGS. 4-6, the frame 106 defines a frame center C (FIG. 5) and includes a frame body 110 and a supporting wall 112 extending from the frame body 110. Specifically, the supporting wall 112 extends from the frame body 110 toward the frame center C and can support the insert 108 (FIG. 1). The frame body 110 may be a one-piece structure and defines an inner frame surface 114 disposed around the supporting wall 112. The supporting wall 112 is coupled along an entirety of the inner frame surface 114. The inner frame surface 114 and the supporting wall 112 jointly define a frame cavity 116. The frame cavity 116 is configured, shaped, and sized to receive the insert 108 (FIG. 1).

The frame 106 additionally includes a frame opening 118. In particular, the supporting wall 112 has an inner wall surface 120 that defines the frame opening 118. At least a portion of the frame opening 118 extends through the frame center C and is in communication with the frame cavity 116.

Aside from the frame opening 118, the frame 106 includes at least one frame dowel 122 extending from the supporting wall 112. In the depicted embodiment, the frame 106 includes two frame dowels 122. However, the frame 106 may include more or fewer frame dowels 122. Irrespective of the quantity, each frame dowel 122 is configured, shaped, and sized to engage the insert 108 (FIG. 1) so as to locate the insert 108 with respect to the frame 106 when the insert 108 is disposed in the frame cavity 116. The frame dowels 122 may have a substantially cylindrical shape and, when engaged with the insert 108, can secure the insert 108 in the frame cavity 116.

The frame body 110 may be a one-piece structure and has an outer frame sidewall 124 defining the entire outer perimeter of the frame 106. The frame 106 also includes at least one grip bushings 126 (FIG. 4) extending into the outer frame sidewall 124. Each grip bushing 126 is configured to receive an end effector of a robotic arm, thereby allowing the robotic arm to engage the frame 106. In the depicted embodiment, the frame 106 includes more than one grip bushing 126.

The frame 106 can also be manually grabbed by an operator. To this end, the frame 106 includes at least one handle 128 coupled to the frame body 110. In the depicted embodiment, the frame 106 includes two handles 128, and each handle 128 is configured as a bar 130 coupled to the frame body 110. Although coupled to the frame body 110, each bar 130 is spaced apart from part of the frame body 110 so as to define a handle opening 132. During use, the operator may insert at least part of the hand through the handle opening 132 and grab the bar 130 in order to hold the frame 106.

The frame 106 further includes a retention block 134 coupled to the frame body 110. In the depicted embodiment, the retention block 134 can retain a plurality of studs 136 and is coupled to the frame body 110 and at least part of the handle 128. Specifically, the retention block 134 is at least partially disposed on the frame body 110. The studs 136 can be used to secure the cylinder head 102 (FIG. 1) to the insert 108. The retention block 134 may include a plurality of retaining holes 138 (FIG. 5) each configured to receive at least a portion of one stud 136. Each stud 136 can be partially inserted into one retaining hole 138 in order to couple the stud 136 to the frame 106. The studs 136 can be placed in the retaining holes 138 until is time to secure the cylinder head 102 (FIG. 1) to the insert 108 with the studs 136. In the depicted embodiment, the retention block 134 has four retaining holes 138; however, it is contemplated that the retention block 134 may have more or fewer retaining holes 138.

In addition to the retention block 134, the frame 106 includes bumpers 140 coupled to the frame body 110. The bumpers 140 are wholly or partly made of an elastic material, such as an elastomer. As a non-limiting example, the bumpers 140 are wholly or partly made of rubber. In the depicted embodiment, the frame 106 includes a first edge surface 142 and a second edge 144 surface opposite the first edge surface 142. The bumpers 140 extend from the first edge surface 142 and may have a substantially cylindrical shape. Regardless of their shape, each bumper 140 is configured to absorb a force exerted by another plate assembly 104. During the manufacturing process, several plate assemblies 104 may be arranged linearly. It is useful to avoid direct contact between the frame bodies 110. To this end, the bumpers 140 can serve as a cushion and prevent direct contact between the frame bodies 110.

The frame 106 includes a sensing system 146 for determining whether the insert 108 is disposed in the frame cavity 116 and the cylinder head 102 is disposed on the insert 108. In other words, the sensing system 146 can detect the presence of the cylinder head 102 on the plate assembly 104 when the insert 108 is disposed in the frame cavity 116 and the insert 108 is supporting the cylinder head 102. The sensing system 146 includes a fluid source coupling 148 configured to be coupled to a fluid source, a fluid passageway 150 in fluid communication with the fluid source coupling 148, and a sensing hole 152 in fluid communication with the fluid passageway 150. At least part of the fluid source coupling 148 extends from a bottom frame surface 154 of the frame body 110. The frame body 110 also includes a top frame surface 156 opposite the bottom frame surface 154. The frame 106 may include two fluid source couplings 148 and each is configured to be coupled to a fluid source, such as an air source. See also FIG. 2. Because the fluid source coupling 148 is in fluid communication with the fluid passageway 150, a fluid from the fluid source can flow from the fluid source coupling 148 to the fluid passageway 150. The fluid passageway 150 can extend through the frame body 110 and the supporting wall 112 and is in fluid communication with the sensing hole 152. The sensing hole 152 is open at a top wall surface 158 of the supporting wall 112. The supporting wall 112 also includes a bottom wall surface 160 opposite the top wall surface 158. Although FIG. 5 show the sensing holes 152 at a corner section of the supporting wall 112, the sensing holes 152 may be positioned along other sections of the supporting wall 112 as shown in FIG. 6. For instance, in FIG. 6, the sensing holes 152 are located between the corner sections of the supporting walls 112. The sensing holes 152, the fluid passageway 150, and the fluid source couplings 148 are in communication with a pressure sensor that detects the pressure in the fluid passageway 150. As such, when the insert 108 is disposed in the frame cavity 116 and the cylinder head 102 is disposed on the insert 108, the insert 108 at least partially blocks the sensing holes 152 due to the weight of the cylinder head 102 on the insert 108, thereby changing the pressure of the fluid (e.g., air) in the fluid passageway 150. The pressure sensor coupled to the fluid source coupling 148 can detect this change in pressure and, consequently, alert the user that the insert 108 is disposed in the frame cavity 116 and the cylinder head 102 is disposed on the insert 108.

With reference to FIGS. 1-3, the frame 106 further includes locating holes 162 extending into the bottom frame surface 154. The locating holes 162 can be used to secure the frame 106 to another clamp or any other suitable tool. Aside from the locating holes 162, the frame 106 has guide bushings 164 extending into the bottom frame surface 154. The guide bushing 164 can be coupled to a fixture in order to secure the frame 106 at a fixed position.

As discussed above, the insert 108 is configured, shaped, and sized to be disposed in the frame cavity 116 (FIG. 4). The insert 108 includes an insert body 166 and can support the cylinder head 102. The insert body 166 may be a one-piece structure and defines a top insert surface 168, a bottom insert surface 170 opposite to the top insert surface 168, and a lateral insert surface 172 interconnecting the top and bottom insert surfaces 168, 170. The supporting wall 112 of the frame 106 supports the insert 108 such that the inner frame surface 114 surrounds the lateral insert surface 172 and the supporting wall 112 contacts the bottom insert surface 170 when the insert 108 is disposed in the frame cavity 116. The insert 108 further includes at least one rest pad 176 coupled to the insert body 166. In the depicted embodiment, the insert 108 includes four rest pads 176 disposed on the top insert surface 168. It is nonetheless contemplated that the insert 108 may include more or fewer rest pads 176. Regardless of the quantity, each rest pad 176 has an engaging hole 178 configured to receive at least a portion of one stud 136. Consequently, the studs 136 can be inserted in the engaging holes 178 of the rest pads 176 in order to couple the studs 136 to the insert 108. In FIG. 3, the studs 136 are shown coupled to the rest pads 176 without the cylinder head 102 for illustration purposes only. The studs 136 should be disposed through the cylinder head 102 and into the engaging holes 178 of the rest pads 176 in order to couple the cylinder head 102 to the insert 108 as shown in FIG. 1. The cylinder head 102 rests on the rest pads 176 when the insert 108 supports the cylinder head 102, while the studs 136 are attached to the rest pad 176 in order to secure the cylinder head 102 to the insert 108 when the insert 108 is supporting the cylinder head 102.

The insert 108 further includes at least one locating dowel 180 coupled to the insert body 166. In the depicted embodiment, the insert 108 includes two locating dowels 180 disposed on the top insert surface 168. It is envisioned, however, that the insert 108 may include more or fewer locating dowels 180. The locating dowels 180 are configured to engage the cylinder head 102 so as to locate the cylinder head 108 with respect to the insert 108 when the insert 108 supports the cylinder head 102.

The insert 108 may define an insert opening 182 extending through the insert body 166. In particular, the insert opening 182 extends through the top and bottom insert surfaces 168, 170. When the insert 108 is supported by the supporting wall 112 of frame 106, the insert opening 182 is substantially aligned with the frame opening 118 so as to allow access to the bottom section of the cylinder head 102.

While the best modes for carrying out the invention have been described in detail, those familiar with the art to which this invention relates will recognize various alternative designs and embodiments for practicing the invention within the scope of the appended claims.

The invention claimed is:

1. A plate assembly for supporting a cylinder head, comprising:
   a frame including a frame body and a supporting wall extending from the frame body, the frame body defining an inner frame surface, the inner frame surface and the supporting wall jointly defining a frame cavity, and the supporting wall includes a top wall surface and a bottom wall surface opposite the top wall surface;
   an insert configured to support the cylinder head, the insert being sized to be received in the frame cavity, the insert including an insert body, the insert body defining a top insert surface, a bottom insert surface opposite to the top insert surface, and a lateral insert surface interconnecting the top insert surface and the bottom insert surface;
   wherein the supporting wall supports the insert such that the inner frame surface surrounds the lateral insert surface and the supporting wall contacts the insert bottom surface when the insert is disposed in the frame cavity; and
   wherein the frame includes at least one sensing system at least partially disposed within the supporting wall, the at least one sensing system is configured to detect a presence of the cylinder head on the plate assembly when the insert is disposed in the frame cavity and the insert is supporting the cylinder head, the at least one sensing system includes a fluid source coupling configured to be coupled to a fluid source, a fluid passageway in fluid communication with the fluid source coupling, and a sensing hole in fluid communication with the fluid passageway, the fluid passageway extends through the frame body, and the sensing hole is open at the top wall surface of the supporting wall.

2. The plate assembly of claim 1, wherein the insert further includes at least one rest pad coupled to the top insert surface, and the cylinder head rests on the rest pad when the insert supports the cylinder head.

3. The plate assembly of claim 1, wherein further comprising at least one stud configured to be attached to at least one resting pad in order to secure the cylinder head to the insert when the insert is supporting the cylinder head.

4. The plate assembly of claim 1, wherein the insert includes at least one locating dowel configured to locate the cylinder head with respect to the insert when the insert supports the cylinder head.

5. The plate assembly of claim 1, wherein the frame includes at least one frame dowel extending from the supporting wall, and the at least one frame dowel is configured to engage the insert so at to locate the insert with respect to the frame when the insert is disposed in the frame cavity.

6. The plate assembly of claim 1, wherein the supporting wall is coupled along an entirety of the inner frame surface.

7. The plate assembly of claim 1, wherein the insert defines an insert opening extending through the insert body.

8. The plate assembly of claim 7, wherein the insert opening extends through the top insert surface and the bottom insert surface.

9. The plate assembly of claim 8, wherein the supporting wall defines an inner wall surface that defines a frame opening, and the frame opening is substantially aligned with the insert opening when the insert is supported by the supporting wall.

10. A manufacturing arrangement, comprising:
    a cylinder head;
    a plate assembly configured to support the cylinder head, wherein the plate assembly includes:
      a frame including frame body and a supporting wall extending from the frame body, the frame body defining an inner frame surface, the inner frame surface partially defining a frame cavity;
      an insert configured to support the cylinder head, the insert being sized to be received in the frame cavity, the insert defining a lateral insert surface; and
    wherein the supporting wall supports the insert such that the inner frame surface surrounds the lateral insert surface when the insert is disposed in the frame cavity.

11. The manufacturing arrangement of claim 10, wherein the insert defining a top insert surface connected to the lateral insert surface, the insert further includes at least one rest pad coupled to the top insert surface, and the cylinder head rests on the rest pad when the insert supports the cylinder head.

12. The manufacturing arrangement of claim 10, wherein further comprising at least one stud configured to be attached to at least one resting pad in order to secure the cylinder head to the insert when the insert is supporting the cylinder head.

13. The manufacturing arrangement of claim 10, wherein the insert includes at least one locating dowel configured to locate the cylinder head with respect to the insert when the insert supports the cylinder head.

14. The manufacturing arrangement of claim 10, wherein the frame includes one locating dowel extending from the supporting wall, and the at least one locating dowel is configured to locate the insert with respect to the frame when the insert is disposed in the frame cavity.

15. The manufacturing arrangement of claim 10, wherein frame defines a sensing hole that is open at a top wall surface of the supporting wall, and a fluid passageway extending through the frame body and the supporting wall, and the fluid passageway is in fluid communication with the sensing hole.

16. The manufacturing arrangement of claim 10, wherein the supporting wall is coupled along an entirety of the inner frame surface.

17. The manufacturing arrangement of claim 10, wherein the insert includes an insert body and defines an insert opening extending through the insert body.

18. The manufacturing arrangement of claim 17, wherein the insert defines a top insert surface and a bottom insert surface opposite the top insert surface, and the insert opening extends through the top insert surface and the bottom insert surface.

19. The manufacturing arrangement of claim 18, wherein the supporting wall defines an inner wall surface that defines a frame opening, and the frame opening is substantially aligned with the insert opening when the insert is supported by the supporting wall.

\* \* \* \* \*